United States Patent [19]

Kross et al.

[11] Patent Number: 6,063,425

[45] Date of Patent: May 16, 2000

[54] METHOD FOR OPTIMIZING THE EFFICACY OF CHLOROUS ACID DISINFECTING SPRAYS FOR POULTRY AND OTHER MEATS

[75] Inventors: Robert D. Kross, Bellmore, N.Y.; G. Kere Kemp, Mercer Island, Wash.

[73] Assignee: Alcide Corporation, Redmond, Wash.

[21] Appl. No.: 08/948,628

[22] Filed: Oct. 9, 1997

[51] Int. Cl.[7] ............................ A22C 21/00; A23L 3/358
[52] U.S. Cl. ......................... 426/335; 426/332; 426/644; 426/654; 426/665; 424/661; 424/665
[58] Field of Search .................................. 423/477, 472, 423/478, 473, 475; 252/187.23, 95, 90, 100, 106, 105; 210/173, 206, 754, 764, 198.1; 422/32, 33, 37, 242, 295; 424/665, 661, 78, 81; 426/332, 335, 644, 654, 665

[56] References Cited

U.S. PATENT DOCUMENTS

| | | | |
|---|---|---|---|
| 4,140,649 | 2/1979 | Bossert et al. | 426/286 |
| 4,731,193 | 3/1988 | Mason et al. | 510/370 |
| 4,891,216 | 1/1990 | Kross et al. | 424/661 |
| 4,925,645 | 5/1990 | Mason | 423/477 |
| 4,986,990 | 1/1991 | Davidson et al. | 424/665 |
| 5,171,441 | 12/1992 | Mason | 210/206 |
| 5,185,161 | 2/1993 | Davidson et al. | 424/665 |
| 5,380,518 | 1/1995 | Roozdar | 423/477 |
| 5,389,390 | 2/1995 | Kross et al. | 426/332 |

FOREIGN PATENT DOCUMENTS

| | | |
|---|---|---|
| 287 074 A2 | 10/1988 | European Pat. Off. . |
| 581 550 A1 | 2/1994 | European Pat. Off. . |
| WO 96/25049 | 8/1996 | WIPO . |

OTHER PUBLICATIONS

Fu et al, 1994, Journal of Food Science, vol. 59, No. 2, pp. 306–309.

*Primary Examiner*—Ali Salimi
*Attorney, Agent, or Firm*—Seed Intellectual Property Law Group PLLC

[57] ABSTRACT

A method for disinfecting a meat carcass by spray application of an aqueous solution containing from about 0.05–0.12% of a metal chlorite and a sufficient quantity of an acid having a $pK_a$ of from about 2.0–4.4 to adjust the pH of the aqueous solution to about 2.2–4.5 and to maintain the chlorite ion concentration in the form of chlorous acid to not more than about 35% by weight of the aqueous solution, the molar ratio of the acid to metal chlorite being at least equal to the first $pK_a$ of the acid multiplied by the grams/liter concentration of metal chlorite in the aqueous solution. In one embodiment, the meat carcass is poultry.

12 Claims, 1 Drawing Sheet

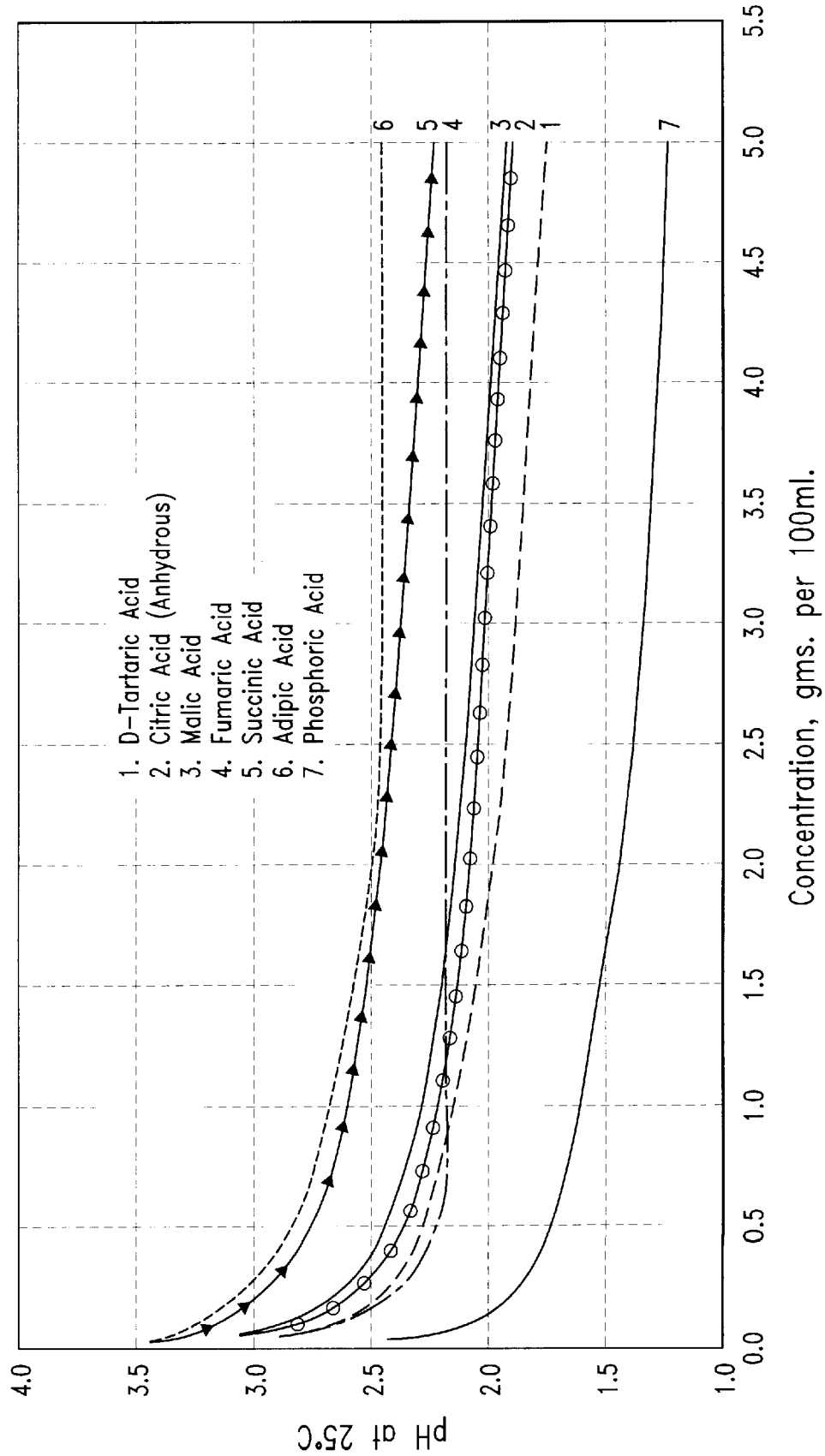

METHOD FOR OPTIMIZING THE EFFICACY OF CHLOROUS ACID DISINFECTING SPRAYS FOR POULTRY AND OTHER MEATS

TECHNICAL FIELD

This invention relates to a method for increasing the efficacy of chlorous acid antimicrobial spray solutions used to remove pathogenic and spoilage organisms from the surfaces of food products such as poultry and other meats.

BACKGROUND OF THE INVENTION

The surfaces of freshly slaughtered and eviscerated poultry and other meats are contaminated with microorganisms that are present on the animals' skins, hides, feathers and hair from fecal contact from both the animal itself and nearby animals, as well as by physical transfer from the animals' viscera through contact with processing equipment. The bacteria of greatest concern are pathogens such as Salmonella and Campylobacter species, *Escherichia coli*, including the particularly virulent strain 0157:H7, *Listeria monocytogenes* and other harmful *enterobacteriaceae*. Many of these organisms can survive carcass scalding temperatures of 50° C. to 58° C., and thereafter cross-contaminate other carcasses on the processing line. This is true also for the so-called "spoilage organisms," where excessive levels of the psychrotrophic and lactic acid bacteria will reduce the shelf-life of the final processed poultry and meat products by proliferating to a level where odor and textural qualities make the meat products unacceptable to the consumer.

In poultry processing, until recently, the primary focus for reducing surface pathogens was directed to the use of chiller tanks, where antimicrobials such as chlorine and chlorine dioxide were included in the processing waters. These were intended to lower the levels of carcass pathogens that had transferred to the water, and reduce their cross-contamination with other carcasses. Regulatory authorities in the United States have now approved the use of acidified chlorite/chlorous acid antimicrobial systems for inclusion in chiller tanks, as well as for direct application to the defeathered/eviscerated carcasses immediately prior to their immersion in the chiller waters. This results in the destruction of surface pathogens on individual carcasses, thereby reducing or eliminating their numbers so that they cannot subsequently contaminate the chiller waters and other non-contaminated carcasses. The application of these chlorite/chlorous acid systems may be either by separate immersion of each poultry carcass in the liquid germicide solution, or by spray application. When these systems are used to disinfect the surfaces of red-meat carcasses, following evisceration, they are applied as sprays.

The chlorite/chlorous acid technology was the subject of U.S. Pat. No. 5,389,390, for removing bacteria from poultry and other meats. According to that patent, the disinfecting solutions can contain about from 0.001% to about 0.2% by weight of metal chlorite, with a sufficient quantity of acid to adjust the pH of the solution to about 2.2 to about 4.5 (and to maintain the chlorite ion concentration in the form of chlorous acid to not more than about 35% by weight of the total chlorite ion present in the aqueous solution). Under such conditions no more than about 35% by weight of the total chlorite ion ($ClO_2^-$) that is present will exist in the chlorous acid ($HClO_2$) form. Preferred acids may be strong inorganic acids such as sulfuric, hydrochloric or phosphoric, or moderate-strength organic acids such as citric, malic or fumaric.

It has now been found that when such chlorite/chlorous acid solutions are applied as sprays to red-meat and poultry carcass surfaces, the levels of disinfection that are achieved are significantly lower than those achieved by immersion. Thus, there is a continuing need for an effective and safe spray disinfectant to apply to animal carcasses soon after the evisceration process, before contaminating organisms can develop a firm foothold on the meat surfaces. The present invention fulfills these needs and provides further related advantages.

SUMMARY OF THE INVENTION

It is an object of the invention to provide a method of increasing the efficiency of destroying microorganisms on animal carcasses and fresh meat products, such as poultry, beef, fish and pork, as well as non-meat food products such as fruits and vegetables.

It is a further and more specific object of the invention to provide a method for spraying poultry carcasses and carcass pieces during processing in order to enhance the efficacy of acidified sodium chlorite solutions in destroying surface microorganisms including such pathogens as Salmonella and *Escherichia coli*.

It is a further object of the invention to provide a method for spraying animal carcasses and carcass pieces, as well as other food products such as fruits and vegetables, with acidified sodium chlorite solutions in order to reduce spoilage microorganisms and thereby extend the commercial shelf life of the treated food products.

These and other objects are accomplished by the present invention, which provides a composition and method for destroying microorganisms on food products by spraying the same with an aqueous solution containing about 0.050% to about 0.12% by weight of a metal chlorite and a quantity of acid such that both (a) the pH of that solution will be reduced to about 2.2 to about 4.5, and (b) the molar ratio of acid to chlorite salt will equal or exceed the first $pK_a$ of the activating acid multiplied by the grams/liter concentration of metal chlorite in the spray solution.

Alkali metal chlorites, such as sodium or potassium chlorite, or a mixture of the same may be used in the practice of this invention. In one embodiment, the alkali metal chlorite is sodium chlorite. In some embodiments, the acid is selected such that it will not fully ionize upon dissolution in water, and is further limited to the group of acids in which no more than about 1 in 100 of its first ionizable acid groups will dissociate in aqueous solution. This corresponds to acids having a first $pK_a$ value of about 2 or higher, although acids of $pK_a$ values greater than about 5 are not appropriate for this application. Suitable acids for use in this invention include phosphoric acid, citric acid, lactic acid, malic acid, fumaric acid and acetic acid, or mixtures of the same. When mixtures of acids are used, the molar ratio of acid to metal chlorite is based on the weighted average of molar acid concentrations of the acids in the mixture.

When disinfecting meat products, the compositions of this invention are used as a spray on the animal carcass or carcass pieces shortly after the animal has been eviscerated, and/or cut up when applied to carcass pieces. In the practice of the invention, the spray may be applied one or several times. as needed to reduce carcass microorganisms including pathogens. In the case of poultry, the spray may also be applied to the carcass after removal from the chiller tank. The compositions of this invention may also be used in more than one of these processing steps. In one embodiment, the acidified metal chlorite solution is allowed to remain on the disinfected carcass for a minimum of 30 seconds before its removal in a subsequent processing step.

These and other aspects of this invention will become evident upon reference to the following detailed description.

BRIEF DESCRIPTION OF THE DRAWING

The FIGURE depicts the pH of aqueous solutions at various ion concentrations ranging from 0 to 5.0 grams per 100 ml.

DETAILED DESCRIPTION OF THE INVENTION

As mentioned above, when the chlorite/chlorous acid solutions of U.S. Pat. No. 5,389,390 (hereinafter "the '390 patent") are applied as sprays to red-meat and poultry carcass surfaces, the levels of disinfection that are achieved are significantly lower than those achieved by immersion. This invention is a result of investigations conducted to overcome the deficiencies associated with such spray application of acidified chlorite solutions, particularly with regard to prolonging the availability of hydrogen ions so that a greater amount of the chlorous acid germicide is available to further reduce the level of pathogenic microorganisms. In the practice of this invention, any food product surface may be disinfected by the procedures and compositions disclosed herein, including meat, fruit and vegetable surfaces. However, for purpose of illustration, the food product surfaces hereinafter exemplified are meat surfaces, such as poultry and beef. However, it should be understood that the invention is not to be limited in this manner.

It is believed that during the immersion process, there is a virtually-boundless surrounding reservoir of acidity, from which to replenish the chlorous acid germicide depleted by disinfection. That is, as the following reaction proceeds:

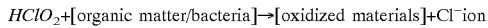

$HClO_2$+[organic matter/bacteria]→[oxidized materials]+$Cl^-$ion additional $ClO_2^-$ can form more chlorous acid from other hydrogen ions [$H^+$] in the aqueous environment. These [$H^+$] ions are particularly available from immersion solutions where the acidifying agent has a first $pK_a$ greater than about 2, such as for phosphoric acid ($pK_a$=2.15), fumaric acid ($pK_a$=3.03), citric acid ($pK_a$=3.13) and malic acid ($pK_a$=3.40). However, when the chlorite/chlorous acid solutions are sprayed onto carcass surfaces, the thin liquid film apparently constitutes an insufficient liquid reservoir from which ample [$H^+$] can be drawn to replenish the depleted chlorous acid. There is a similar deficiency in the spray application of other carcass disinfectants, such as chlorine and chlorine dioxide, both of which are gasses and rapidly lost by evaporation from the thin sprayed films.

Accordingly, this invention is an improvement upon the '390 patent in which aqueous solutions containing from about 0.001% to about 0.2% by weight of a metal chlorite, adjusted to a pH from about 2.2 to about 4.5, are applied by spraying fresh poultry or other meat carcasses, or carcass pieces, in order to remove unwanted bacteria. In the practice of the '390 patent, the preferred acids in some embodiments included such strong acids as hydrochloric acid, sulfuric acid and phosphoric acid. When used as a spray on carcasses or carcass pieces the metal chlorite is used at a concentration from about 0.075% to about 0.15%, and the solution is adjusted to a pH of about 2.4 to about 3.0. When applied as a spray to poultry carcasses or carcass pieces after removal from the chill tank, the concentration of alkali metal chlorite is from about 0.05% to about 0.1% by weight, and is adjusted to a pH of about 2.6 to about 3.2.

No disclosure is provided in the '390 patent regarding the quantities of acid to be used in achieving such pH values, only that "sufficient acid" is used to adjust the pH to the desired range. This adjustment, in essence, is the source of increased levels of chlorous acid, as illustrated by Equation (1):

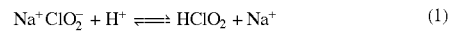

$$Na^+ClO_2^- + H^+ \rightleftharpoons HClO_2 + Na^+ \tag{1}$$

It is well established that the efficacy of acidified chlorite acid systems depends, to a significant degree, on the level of chlorous acid, both absolute and relative, that is present in the solution. Chlorous acid is the source of the antimicrobial oxidants that are transiently formed when the unstable chlorous acid degrades to the more stable reaction products (chloride and chlorate, as well as the oxidant chlorine dioxide). The cascade of reactions which takes place is represented by the empirical formula expressing the rate of degradation of chlorous acid, in the absence of significant chloride ion, as expressed by Equation (2):

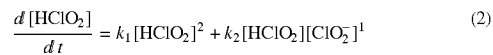

$$\frac{d[HClO_2]}{dt} = k_1[HClO_2]^2 + k_2[HClO_2][ClO_2^-]^1 \tag{2}$$

The more rapid the degradation, when bacteria are present in the aqueous system, the more rapidly they are killed. The level of chlorite present also plays a role, but this is approximately fixed by the initial quantity. (Since some of the chlorite is used in creating chlorous acid, its amount will vary as chlorous acid is formed and consumed.)

When a poultry or meat carcass, or carcass piece, is immersed in an acidified chlorite solution, and the chlorous acid in the immediate vicinity of the meat is consumed by interaction with local organic matter and bacteria and/or interaction with skin surfaces, additional chlorite ions in the vicinity of the meat can draw upon other nearby hydrogen ions to form additional amounts of chlorous acid. Without the influx of hydrogen ions into that micro-domain, the chlorous acid level remains reduced, and the pH of that area rises. This loss of continuing activity is consistent with the observation that when acidified chlorite solutions are sprayed onto poultry and other meat carcasses, there is a lesser efficacy in destroying bacterial pathogens than when the meat pieces are immersed in the same solutions.

The '390 patent does not specify the nature of the acid which may be used for converting the metal chlorite to the active chlorous acid species. Indeed it indicates that such strong mineral acids as sulfuric and hydrochloric acids are useful, as well as such weaker acids as lactic, although lactic acid can result in undesired skin effects. It has surprisingly been discovered that there is a subclass of acids which can be used to overcome the deficiencies associated with the spray application of acidified chlorite solutions to meat and poultry surfaces. This group of acids, which includes phosphoric acid, can provide the requisite supplementation of hydrogen ions when their use levels are specified in proportion to the amounts of chlorite that are present in the disinfecting spray system.

Those ordinarily skilled in the field of chemistry would attempt to overcome the acid deficiency in the micro-domain of the sprayed meat by simply increasing the initial amounts of acid. However, if that were done using acids such as sulfuric or hydrochloric, the pH of the resulting solution would fall below the range of about 2.2 to about 4.5 that the '390 patent requires. At lower pH's, the excessive chlorous acid levels would result in its rapid degradation, according to the rate expression shown in Equation (2) above.

In the practice of this invention, it has been found that, if the nature of the acid and its level of use in the spray solution meet the following criteria, one can achieve a disinfecting capability comparable to that achieved with immersion solutions:

(a) an acid with a $pK_a$ of from about 2.0 to about 4.4;

(b) use of that acid at a concentration such that its molar ratio with respect to chlorite is equal to, or greater than the $pK_a$ value of that acid, multiplied by the gram/liter concentration of metal chlorite in the spray solution (i.e., [acid]:[chlorite]≧(pKa).[chlorite ]); and (c) maintaining the pH of the spray solution at a pH from about 2.2 to about 4.5.

The present invention discloses the use of excess levels of particular acids, for partial conversion of chlorite to chlorous acid, where a pseudo-buffering effect can be achieved from these acids to achieve stabilized pH ranges outside of their normal buffering ranges. For example, the normal midpoint of the buffering range of an acid corresponds to its $pK_{va}$ value according from the well-known Henderson-Hasselbach Equation (3):

$$pH = pK_a + \log\frac{[\text{Anion Form}]}{[\text{Acid Form}]} \quad (3)$$

When the Anion Form and Acid Form of the molecule are equivalent, the final log term becomes 0, and $pH=pK_a$. Thus, for example, malic acid will form its most stable buffer at a pH of about 3.40, which is equivalent to its $pK_a$. However, for use in this invention, when a pH is required to effect a more efficient antimicrobial activity at, say pH=2.3 for a 1.0 gm/liter sodium chlorite solution, it is possible to achieve a concentration-driven pseudo-buffer, which will provide a continuing source of hydrogen ions [H+] in a sprayed film of acidified metal chlorite solution by using a molar malic acid concentration that is at least 3.4 times that of the molar chlorite concentration. With an initial concentration of sodium chlorite of 0.12% (1.2 gm/liter), for example, that would correspond to a minimum malic acid concentration of 0.726%. At that concentration, as illustrated in the FIGURE, there is a relatively small upward shift of the pH, from about 2.4, as a small fraction of malic acid is consumed in converting chlorite to chlorous acid. When half of that chlorite salt is reacted, the remaining concentration of malic acid is 0.636% and the corresponding pH, according to the FIGURE, is still about 2.4.

If a weaker acid is employed, say succinic acid, with a $pK_a$ of 4.19, then the minimum acid concentration to be used, corresponding to the same 1.2 gm/liter sodium chlorite solution, would be 0.79%. As shown in the FIGURE, this point lies at a portion of the pH/concentration curve where relatively small consumptions of acid by the chlorite will cause relatively small pH changes. If the lower claimed limit of 0.05% metal chlorite, as sodium chlorite, were to be used with succinic acid in the spray, the minimum concentration of acid according to this invention would be 0.14%, corresponding to a pH of about 3.1. When half the chlorite is consumed by the succinic acid, whose concentration would be reduced to about 0.10%, the pH would only rise to about 3.2.

In both of these illustrative cases, a relatively invariant pH can be achieved using acid materials whose normal buffering ranges (pH~3.40 for malic; pH ~4.19 for succinic) are significantly different from the concentration-driven pH values (2.4 and 3.1 for malic and succinic acids, respectively). Acids such as phosphoric acid, with a $pK_a$ near the low range of the range of acid $pK_a$'s, about 2.0 to about 4.4, can only effectively stabilize spray formulations that are intended to be used at pH's near or slightly above the lower pH limit of 2.2 disclosed in this invention. Under these conditions the similarity between the $pK_a$ and desired pH also accommodates a major contribution of the acid's buffering capacity in providing a continuing source of hydrogen ion.

The following examples are presented to further illustrate and explain the present invention, and should not be taken as limiting in any regard. Unless otherwise indicated, all parts and percentages are by weight.

EXAMPLES

Example 1

This example illustrates the effect of spraying poultry carcasses with citric acid-activated sodium chlorite solutions, at a 0.12% sodium chlorite concentration, in comparison with non-sprayed carcasses, where the enhanced antimicrobial activity created by optimizing citric acid levels as taught by this invention was determined by measuring the levels of (1) Total Aerobic Organisms, (2) *E. Coli* and (3) Total Coliforms (excluding *E. coli*).

The study was run with groups of 10 commercial 1.5–2.0 kg broilers, of mixed sex, averaging 35 days in age. These were processed in a pilot slaughter facility and sprayed with 3 oz. of acidified chlorite solutions 30 sec. after postevisceration water washing. The sprays were then allowed to remain on the carcasses for 30 sec. before water removal during further processing.

One spray solution contained that quantity of citric acid necessary to reduce the pH of the 0.12% solution to about 2.5. The acid:chlorite mole ratio for that solution was 1.4, which is below the 3.76 threshold for this combination of citric acid and sodium chlorite (i.e., ($pK_a$ of citric acid= 3.13).(1.2 gm/l chlorite)=3.76). The other spray solution had a mole ratio of 3.8, which equals that threshold. A small quantity of alkali was added to the latter solution to adjust its pH upwards from about 2.38 to about the same 2.5 value as the 1.4 mole ratio solution. As mentioned above, U.S. regulating authorities have approved the use of acidified chlorite/chlorous acid solutions for disinfection of poultry carcasses at a pH range from 2.5 to 3.2. Accordingly, the alkali was added such that the test solution fell within the approved range. It should be noted, however, that alkali does not constitute a necessary component of the disinfecting solution.

Following microbiological evaluation by standard procedures, the logarithmic reductions of the three organism groups identified above were determined on the sprayed carcasses, in comparison with the corresponding microbial counts on untreated carcasses (control). The results are presented in Table 1.

TABLE 1

| Citric-Chlorite Treatment | log reduction of test vs. Control Organism Group | | |
| --- | --- | --- | --- |
| Mole Ratio | Total aerobes | *E. Coli* | Total coliforms |
| 1.4 | 0.43 | 0.90 | 0.71 |
| 3.8 | 0.98 | 1.71 | 1.21 |

The results of Table 1 evidence that use of an amount of acid which is at least equal to the threshold concentration-adjusted mole ratio (CAMR) of citric acid:sodium chlorite of 3.76 (3.13×1.2) resulted in superior log reduction of the pathogenic organisms tested.

Example 2

This example illustrates the effect of spraying poultry carcasses with phosphoric acid-activated sodium chlorite solutions, at a 0.085% sodium chlorite concentration, in comparison with non-sprayed carcasses, where the enhanced antimicrobial activity created by augmenting phosphoric acid levels was determined by measuring the increased percentage reductions of (1) Total Aerobic Organisms, (2) E. coli and (3) Total Coliforms (excluding E. coli). The study was run in the same manner as, and with groups of chickens similar to, those employed in Example 1. The mole ratio of the augmented spray solution (1.9) approximated the threshold CAMR value for the phosphoric acid/sodium chlorite concentration (1.83), as compared with the mole ratio of the non-augmented solution (0.68). As presented in Table 2, the augmented solution showed improved reduction of the potentially-pathogenic coliform groups, but not for the aerobic organisms. It is generally believed that a significant reduction of normal skin flora, as reflected by the total aerobic organisms, is undesirable, inasmuch as their continued presence tends to competitively surpass the growth of pathogenic organisms. Thus, the lesser effect of the acid-augmented treatment solution on the "Total aerobes" of Table 2 may be considered a positive finding.

TABLE 2

| Phosphoric-Chlorite Treatment | % reduction vs. Control Organism Group | | |
|---|---|---|---|
| Mole Ratio* | Total aerobes | E. coli | Total coliforms |
| 0.68 | 34% | 25% | 45% |
| 1.9 | 37% | 14% | 35% |

Example 3

This example illustrates the difference between two 0.121% sodium chlorite spray compositions, both acidified with phosphoric acid, in their ability to destroy the pathogen Escherichia coli 01 57:H7. The threshold CAMR for both solution was 2.60 (2.15×1.21). One of the solutions had a level of phosphoric acid which provided a CAMR of 0.661, and the other a CAMR of 2.69. Various representative meat cuts were selected from cattle freshly slaughtered and dressed in a university abattoir according to commercial procedures, and the surfaces of the cuts were overspread with an inoculum of a rifampicin-resistant strain of E. coli 0157:H7 admixed into a cow feces base. After contamination, the cuts were washed with low- and high-pressure water sprays and separated into one Control and one or two Test groups. Two minutes after washing, the Test group(s) were further sprayed for 10 seconds with a phosphoric acid-activated sodium chlorite solution. After dripping, all the pieces were then subjected to microbiological analysis.

In the following study, for the subthreshold application, the concentration of phosphoric acid in the 0.121% sodium chlorite spray solution was 0.0868% (8.86 millimolar), the chlorite concentration was 13.4 millimolar, and the mole ratio of acid to chlorite was 0.661. In this part of the study, two sets of spray solutions were tested, one including a surface active agent to promote wetting, and one without it.

In the suprathreshold study the phosphoric acid concentration was 36.0 millimolar and, with the same chlorite level in the spray, the mole ratio of acid to chlorite was 2.69. No surfactant was included in this suprathreshold spray. The threshold CAMR for the combination of acid and chlorite employed in these studies is 2.15×1.21=2.60; thus the first spray was significantly below the threshold value and the second slightly exceeded it.

The results for these studies, expressed in terms of logarithmic reductions in the residual E. coli pathogens per $cm^2$ of contaminated meat surfaces compared with the washed but untreated meat surfaces, are presented in Table 3.

TABLE 3

| Treatment | Mole Ratio Acid/Chlorite | Log Reduction E. coli (cfu/$cm^2$) |
|---|---|---|
| Subthreshold CAMR; no surfactant | 0.661 | 0.54 |
| Subthreshold CAMR; with surfactant | | 1.21 |
| Suprathreshold CAMR; no surfactant | 2.69 | 4.60 |

As illustrated by the data of Table 3, a significantly greater reduction of contaminating red-meat pathogens was achieved by adjusting the mole ratio of acid:chlorite to equal or exceed the threshold CAMR.

Example 4

This example illustrates the use of citric acid as an acidifier of a 0.121% sodium chlorite spray solution, according to the procedure of Example 3, where the citric acid level was selected to slightly exceed the CAMR for that combination of acid and chlorite.

In this study the meat cuts were contaminated with one of two pathogens, E. coli 0157:H7 or Salmonella typhimurium, in the manner described in Example 3. The concentration of citric acid in the spray solution was 51.57 millimolar, and the mole ratio with respect to the 13.4 millimolar chlorite concentration was 3.86. The CAMR for this combination, of 3.13×1.21 is the threshold value of 3.79, slightly below the mole ratio employed in this suprathreshold study. The logarithmic reductions of these organisms, following treatment with the spray solution in the manner described in Example 3, are presented in Table 4.

TABLE 4

| Contaminant | Log Reduction |
|---|---|
| E. coli | 4.5 $log_{10}$/$cm^2$ |
| Staph. Aureus | 4.6 $log_{10}$/$cm^2$ |

These results illustrate that spraying meats with citric acid activated sodium chlorite solutions, with citric acid exceeding in concentration the level required by the CAMR threshold, leads to a highly significant reduction in the level of surface bacterial pathogens.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method for disinfecting a food product surface, comprising contacting the surface by spray application of an aqueous solution containing from about 0.075% to about 0.12% by weight of a metal chlorite, and a sufficient quantity of acid having a first pKa of from about 2.0 to about 4.4 to adjust the pH of the aqueous solution to about 2.2 to about 4.5 and to maintain the chlorite ion concentration in the form of chlorous acid to not more than about 35% by weight of the total chlorite ion present in the aqueous solution, wherein the molar ratio of acid to metal chlorite is at least equal to the first $pK_a$ of the acid multiplied by the grams/liter concentration of metal chlorite in the aqueous solution, and with the proviso that when the acid is lactic acid the molar ratio of lactic acid to metal chlorite is in excess of about 5.6.

2. The method of claim 1 wherein the molar ratio of acid to metal chlorite is greater than the first $pK_a$ of the acid multiplied by the grams/liter concentration of metal chlorite in the aqueous solution.

3. The method of claim 1 wherein the acid is selected from phosphoric acid, citric acid, lactic acid, malic acid, fumaric acid, acetic acid, and mixtures thereof.

4. The method of claim 1 wherein the metal chlorite is sodium chlorite.

5. The method of claim 1 wherein the aqueous solution is allowed to remain on the surface for a period of time ranging from 30 seconds to 10 minutes prior to removal.

6. The method of claim 1 wherein spray application of the aqueous solution is performed at least twice.

7. The method of claim 1 wherein the food product is a meat carcass.

8. The method of claim 7 wherein the meat carcass is poultry.

9. The method of claim 7 wherein the meat carcass is beef.

10. The method of claim 7 wherein the meat carcass is selected from fish and pork.

11. The method of claim 1 wherein the surface is a fruit surface.

12. The method of claim 1 wherein the surface is a vegetable surface.

* * * * *